United States Patent [19]
Teller

[11] 3,759,496
[45] Sept. 18, 1973

[54] PROCESS FOR COOLING LIQUIDS BY CROSS CURRENT CONTACT WITH GASES

[75] Inventor: Aaron J. Teller, Great Neck, N.Y.

[73] Assignee: Teller Environmental Systems, Inc., New York, N.Y.

[22] Filed: Dec. 29, 1970

[21] Appl. No.: 102,366

[52] U.S. Cl. .............................. 261/94, 261/DIG. 11
[51] Int. Cl. .............................................. B01f 3/04
[58] Field of Search .................. 261/DIG. 11, 94–98

[56] References Cited
UNITED STATES PATENTS

| | | | |
|---|---|---|---|
| 2,867,425 | 1/1959 | Teller | 261/95 |
| 3,006,436 | 10/1961 | Starbuck et al. | 261/95 |
| 3,151,187 | 9/1964 | Comte | 261/98 |
| 3,243,166 | 3/1966 | Osenga et al. | 261/DIG. 11 |
| 3,533,607 | 10/1970 | Powers | 261/98 |

FOREIGN PATENTS OR APPLICATIONS

| | | | |
|---|---|---|---|
| 27,938 | 5/1910 | Great Britain | 261/DIG. 11 |
| 259,882 | 10/1926 | Great Britain | 261/95 |

*Primary Examiner*—Tim R. Miles
*Attorney*—Curtis, Morris & Safford

[57] ABSTRACT

A process for cooling water by cross-current contact with air is shown. The contact operation takes place in an inverted, frusto-conical, annular enclosure packed with a packing such as Tellerettes. The water loading is preferably from 3 to 30 gallons per minute per square foot of packing area in the plane normal to the flow of water and the air loading is from 200 to 800 standard cubic feet per minute per square foot of packing area normal to the flow of air. Substantial savings in the ground area required for the cooling tower and in the height of the cooling tower are achieved through use of the process of this invention.

5 Claims, 7 Drawing Figures

PATENTED SEP 18 1973
3,759,496
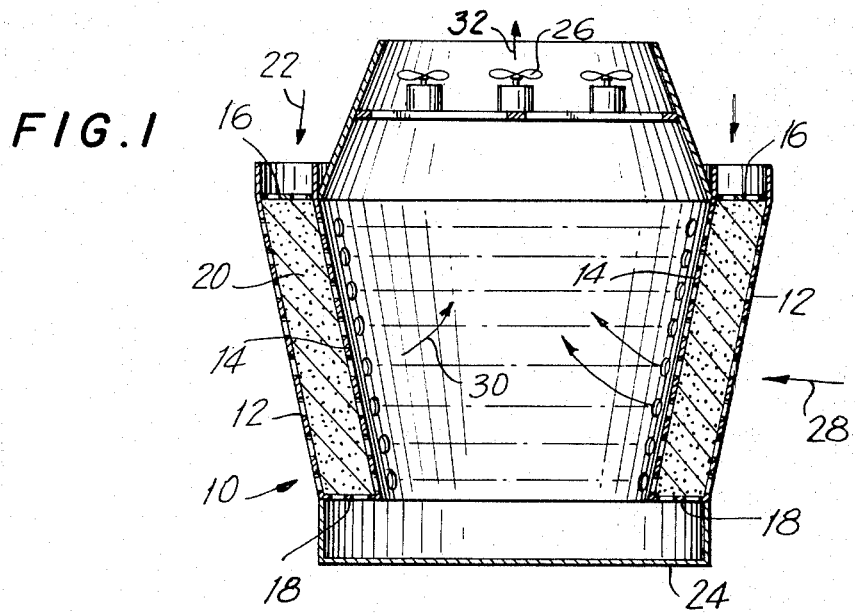
FIG.1
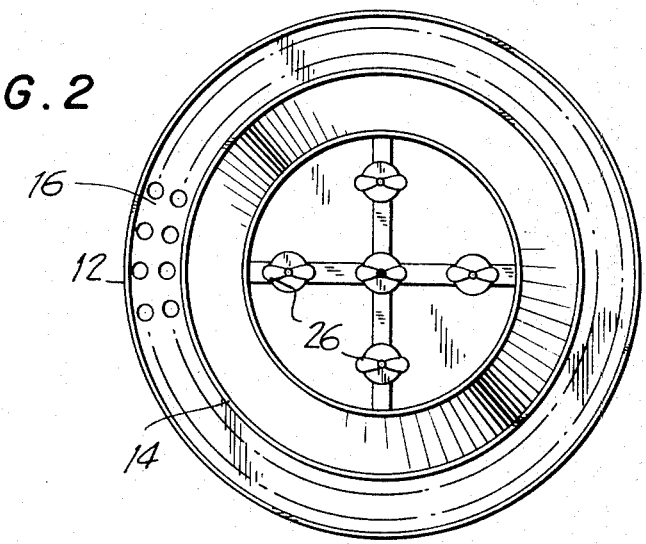
FIG.2
FIG.3
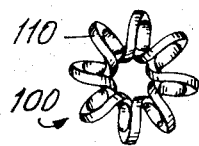
FIG.4
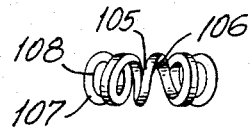
FIG.6
FIG.7
FIG.5
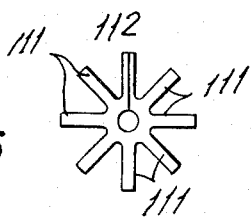
INVENTOR.
AARON J. TELLER
BY
*Custis, Morris & Safford*
ATTORNEYS

PROCESS FOR COOLING LIQUIDS BY CROSS CURRENT CONTACT WITH GASES

This invention relates broadly to a process for cooling liquids by contacting them with gases. More specifically, this invention relates to a process for cooling water by contacting it with air under controlled contacting conditions in order to substantially reduce the area and volume of the contacting zone and reduce the power consumption of the contacting operation. Even more specifically, this invention relates to a process for the cooling of water by cross-flow contact with air in a packed zone of defined geometry containing a prescribed packing material and under defined flow conditions, so as to realize reduction in the size of the cooling tower containing the contacting zone and in the overall power consumption of the cooling operation.

There is a substantial body of technology for cooling water by exposing its surface to a flow of air in a contacting zone. The cooling process involves a transfer of latent heat by vaporization of a small fraction of the water and a relatively small transfer of sensible heat due to the difference in temperature between water and air. Typically, the contacting operation takes place in a tower containing a series of distributing decks or grids over which the hot water flows in countercurrent or crosscurrent contact with a forced draft or induced draft of air. The art is replete with towers of varying design including mechanical distribution systems for breaking up a stream of hot water fed to the upper part of the tower and distributing it evenly in contact with the air stream.

In conventional towers the maximum liquid flow is limited to about 1.75 gallons of water per minute per square foot of tower area in the plane normal to the flow of water. This maximum water loading in turn sets the minimum ground area occupied by the tower. The height of the tower depends on the temperature range through which the water is cooled and the closeness of the approaches between the water temperature and the wet bulb temperature of the air. Although many alternative mechanical distribution configurations are available for maximizing the efficiency of the air-water contact, even the most efficient cooling towers require substantial ground area and tower height per unit of cooling load, as well as substantial power input for the water pumps and air fans. Thus, the most efficient induced draft cooling towers cannot sustain a liquid flow in excess of about 1.75 gallons per minute per square foot of tower area and typically the towers are 35 to 40 feet high.

In many chemical and petroleum plant installations, as well as in miscellaneous industrial applications, ground area is at a premium. Considerable savings can be achieved if the ground area occupied by a cooling tower can be reduced for a given cooling load. Likewise, substantial economies can be achieved if the power consumption per unit of cooling load can be reduced to a minimum by reducing tower height and/or reducing the power consumption of the draft fans. There are also significant technical and process advantages to be gained in improving the efficiency of the air-water contact so that water can be cooled to a lower temperature with a closer approach to the wet built temperature of the ambient air or, alternatively, a greater amount of water can be cooled in a given area.

It is thus the primary object of this invention to provide a process for cooling liquids by contacting them with gases in which the area and height of the cooling tower which contains the gas-liquid contact zone is reduced per unit of cooling load.

It is a further and more specific object of this invention to provide a process for cooling water by cross-current contact with an induced flow of air in which the efficiency of the water-air contact is improved, the area and volume of the cooling tower is reduced or, alternatively, greater cooling capacity per unit area or volume of cooling tower and per unit of power consumption is achieved.

These and other objects of this invention are achieved in a process for cooling a liquid by cross-flow contact with a gas wherein the liquid is passed downwardly through a packed contacting zone at a rate of broadly from 3 to 30 gallons per minute, per square foot of packed zone normal to the direction of flow of liquid. The cooling gas is passed through the packed zone in a direction substantially normal to that of the flow of the liquid, at from 200 to 800 standard cubic feet per minute, per square foot of packed zone normal to the direction of flow of the gas. Desirably, the flow of liquid through the packed zone is from 8 to 25 gallons per minute per square foot and the flow of gas is from 400 to 700 standard cubic feet, per minute per square foot.

It has been found that water can be efficiently cooled by cross-flow contact with an induced flow of air if the water is passed downwardly through a packed contacting zone at the flow rates described above and the air flow rates are such that the pressure drop in the gas, per foot of packing parallel to the direction of flow of gas is from 0.2 to 0.8 inches of water. By operating according to the present process, a more regular distribution of air is achieved and it is possible to substantially reduce the ground area of the cooling tower containing the packed contacting zone and to substantially reduce the height of the tower for a given cooling load. Alternatively, it is possible to cool a heated stream of water to lower temperatures and to closer temperature approaches with the wet bulb temperature of the air. In order to ensure good air distribution it is desirable that the pressure drop of the air passing through the packed zone be from 0.3 to 0.6 inches of water, per foot of packing.

In the preferred embodiment of this invention, the heated water is passed downwardly into a packed contacting zone comprising an enclosure completely filled with a packing such as "Tellerettes." These units are described in detail in U.S. Pat. No. 2,867,425. They are filamentous, having little continuous extensive surface, and having about 80–95 percent free volume. The packing consists of randomly arranged, interlocked units made up of approximately circular, integrally connected filament portions. The axes of the filament portions are approximately tangent to a circle at approximately evenly spaced points thereround. The number of such spaced, approximately circular portions is from 6 to 12 and the diameter of the circle is approximately equal to the diameter of one of the approximately circular filament portions plus the diameter of a smaller circle whose circumference is not less than the cross-section dimension of the filament portion in the direction of its axis times the number of such filament portions and not greater than the circumference of one of such approximately circular filament portions.

In the preferred embodiment of this invention the heated water is passed downwardly into a contacting zone enclosure in the shape of an inverted, frusto-conical annulus. The water is introduced at the preferred rates given above and is evenly distributed into the "Tellerettes" which comprise the packing. Air is drawn through ports in the outer side wall of the contacting enclosure and passes through the packing and ultimately through ports in the inner side wall of the enclosure. The draft of air is induced by means of a fan mounted centrally within the circle defined by the annular enclosure and at a rate so as to realize a pressure drop in the air stream of from 0.2 to 0.8 inches of water. The air is then expelled by the fan from the area central to the packed enclosure and cooled water is removed from the lower end of the contacting enclosure.

It has been found that with the high velocity of the air through the packing, the problem of maldistribution of air flow is substantially minimized, and it is no longer necessary to provide the expensive mechanical design features and controls for establishing a regular and even air flow distribution as are required in conventional cooling towers. It has also been found that the size of the cooling tower is reduced per unit of cooling load and that less ground area and tower height is required as compared with conventional designs. It is possible to achieve a closer temperature approach between air and water by virtue of the substantially improved heat and mass transfer within the contacting zone. This in turn permits a reduction in the air flow which partially offsets the higher fan head required to overcome the pressure drop in the air across the contacting zone. The higher heat and mass transfer rates also result in lesser tower height than in conventional units for the same unit cooling load and there is therefore a decrease in the power consumption of the hot water pumps. Still a further advantage of the present invention is that smaller diameter blowers can be used to develop the reduced air flows and maintenance costs are thereby reduced.

In the drawings:

FIG. 1 is a simplified cross-sectional representation of a preferred arrangement for a cooling tower in which the process of this invention can be carried out;

FIG. 2 is a simplified plan view of the cooling tower of FIG. 1;

FIG. 3 is a plan view of a packing unit useful in the process of this invention;

FIG. 4 is an elevation view of the packing unit of FIG. 3;

FIG. 5 is a plan view of another packing unit useful in the process of this invention;

FIG. 6 is an elevation view showing the packing unit of FIG. 5 in a partially fabricated condition; and FIG. 7 is an end view of the packing unit shown in the condition of FIG. 6.

In FIG. 1, reference numeral 10 refers generally to a cooling tower. Cooling tower 10 is in the shape of an inverted, frusto-conical annulus and is comprised of an outer side member 12, an inner side member 14 and top and bottom members 16 and 18 respectively. The side walls and the top and bottom members may be of any suitable foraminous design for containing the packing units and for permitting the inflow of water through the top member and outflow of water through the bottom member and the passage of air through the side walls. Supported within the annular contacting zone defined by the side, the top and the bottom members is packing 20. Packing 20 is desirably a filamentous packing which presents narrow rectangular elements to the gas flow. Desirably, the free volume in the packing is from 75 to 95 percent of the gross volume, or, stated otherwise, the gross volume is 4 to 20 times the water displacement volume.

The packing most preferred for use in the process of this invention is that disclosed in U.S. Pat. No. 2,867,425 which is available commercially under the trademark "Tellerettes." A preferred packing is illustrated in FIGS. 3–7.

FIGS. 3 and 4 present two views of a unit of packing. This unit consists of a single filament 100 which is first formed into a helix having eight convolutions. The helix is then bent around and the ends joined so that the unit may be considered as having a toroidal shape defined by eight, spaced, circular filament portions each corresponding to one convolution of the helix. The spaced, circular, filament portions are continuous with adjacently spaced filament portions in end to end relationship. The number of convolutions may be greater or less than eight, although for best results there should be at least six convolutions and not more than twelve. Eight is believed to be the optimum. Although the unit described above and set forth in FIGS. 3 and 4 may be made by first forming a single filament such as 100 into th form of a helix and thereafter bending the helix around and joining the ends thereof, it is not essential that the ends be joined so long as substantially the same form of unit, namely a toroidal helix, is produced. If the filament is sufficiently rigid it will retain its shape even though the ends are not actually joined. The convolutions of the toroid helix of FIG. 3 and the loops of FIG. 5 are approximately circular but can depart more or less from true circular. They may be, for example, polygonal. Such variations are obviously equivalent to the forms shown and are intended to be included in the term, "approximately circular."

The packing units can be made of various materials such as glass, metal, ceramics, etc., but they are preferably made of polyethylene or other resinous materials such as polychloroethylene, polychlorofluoroethylenes, polytetrafluoroethylene, polypropylene, etc. If the unit is composed of polyethylene or polyfluoroethylene, or a polychlorofluoroethylene (e.g. polymerized $CClF=F_2$) it is sufficiently flexible to permit easy forming into the toroidal shape. Where the packing unit is made of these materials, it has non-wetting characteristics which are quite desirable, i.e. the liquid in contact with it tends to form aggregates rather than to spread out over the surface in a film.

By filament "depth" is meant the thickness of the filament measured on a radius, as for instance, the distance from point 107 to point 108 on FIG. 4. The "width" of the filament is the distance between points 105 and 106.

In FIGS. 5 and 6 are shown a unit which may be formed by slicing nearly through a tubular element having the cross section shown in FIG. 7 and having the cuts indicated in FIG. 6, and then bending the unit around to the position shown in FIG. 5 and joining the portions 112. Where the material of construction is thermoplastic the two half-thicknesses of ring 112 can be fused so that a unit having seven rings 111 and one ring 112 is formed. It will be apparent that the unit described and shown in FIGS. 5, 6, and 7 likewise has a toroidal shape defined by spaced, approximately circular, filament portions 111 and 112.

Other torus shaped units may be made wherein the toroidal shape is defined by spaced filament portions. The particular shapes set forth in FIGS. 3 through 7, which may be termed "rosettes," are not to be construed as limiting the scope of the invention to be precise shapes shown. For example, the filaments may be rectangular, square, circular, or any other appropriate shape in cross section so long as the toroidal shape of the unit is maintained and the torus is in effect substantially defined by spaced, approximately circular filament portions. Variations may be made in the shapes illustrated, but it is desirable to preserve the filamentous character of the packing, its ability to interlock unit to unit, and its characteristic of having numerous bends which may be curves as shown or angles such as might be formed if the cross section of the tubular element in FIG. 6 were not circular as shown in FIG. 7 but polygonal instead.

For best results, the gross volume of each unit should be from 4 to 20 times its displacement volume, and the bulk volume of each unit should be from 50 percent to 90 percent of the gross volume. The term "gross volume" means the volume of the smallest circumscribed solid free from concave surfaces. The term "displacement volume" means the volume of water displaced by the unit when it is submerged in water. The term "bulk volume" means the volume occupied per unit when a receptacle of cylindrical shape is filled with such units, without compression beyond that due to their own weight, to a depth equal to its diameter, the volume so filled being 50 times the gross volume of one unit. It will be apparent that the bulk volume depends on the ability of the units to interlock with each other. In the case of a ¾" × 1⅞" rosette, the volume of the circumscribed rectangular prism is about 2.6 cubic inches; the gross volume is about 1.9 cubic inches; and the bulk volume is about 1.4 cubic inches.

The minimum length for one, approximately circular, filament portion should be at least 8 times the cross sectional dimension thereof and the internal radius of curvature at all points within the torus should be less than 4 times the major cross sectional dimension of the filament.

With reference again to FIGS. 1 and 2, reference numeral 22 identifies a stream of hot water fed to the top level of packing 20. Any suitable water distribution means can be used, as for example perforated pipes or spray heads. Reference numeral 24 identifies a collection basin for the cool water which passes through the bottom member 18 of the packed zone. Reference numeral 26 refers to one or more fans which are located above the area central to the annular packed zone. Fans 26 may be of conventional design and are sized to induce an air draft through packing 20 in accordance with the process conditions which are described below. The air flow through the packing is shown by reference numerals 28 and 30 and the heated air is shown expelled from the central unit of the cooling tower by reference numeral 32.

In operating the cooling tower shown in FIGS. 1 and 2 according to the process of this invention, hot water is introduced into the top level of packing 20 at a rate of from 3 to 30 gallons per minute per square foot of packing area in the plane normal to the direction of flow of the hot water. By normal to the direction of flow of hot water is meant in the horizontal plane as the water courses down through the packing in the vertical direction. The water is cooled by inducing air current 28 by means of fans 26 and the air passes cross-current to the flow of hot water. In order to achieve the benefits of this invention, the air flow must be from 300 to 800 standard cubic feet per minute, per square foot of area normal to the direction of the air flow, i.e. parallel to the vertical flow of the hot water. It has been found that by maintaining the air flow in the above range and more desirably in the range of from 500 to 700 standard cubic feet per minute, per square foot of packed area, it is possible to achieve the best air-water contact.

The performance of cooling towers wherein the process of this invention is employed is compared in the following examples with the performance of conventional cooling towers. In each example, the water flow, the cooling range and the wet and dry bulb temperatures of the ambient air are the same for the process of this invention and the conventional process.

| Design Conditions | Example I | Conventional Process |
| --- | --- | --- |
| Water Flow, GPM | 1500 | 1500 |
| Cooling Range, °F. | 135-85 | 135-85 |
| Wet Bulb Temp., °F. | 77 | 77 |
| Dry Bulb Temp., °F. | 90 | 90 |
| Process Conditions | | |
| Water Loading, gal/min-sq.ft. | 20 | 1.5 |
| Air Loading, SCF/min-sq.ft. | 450 | 100 |
| Air Pressure Drop per foot of Packing, inches of water | 0.5 | 0.05 |
| Volume of Contact Zone, cu.ft. | 1000 | 20000 |
| Ground Area of Tower, sq.ft. | 200 | 1000 |
| Height of Tower, ft. | 15 | 35 |
| Total Pump and Fan Horsepower | 95 | 110 |

| Design conditions | Example II | Conventional Process |
| --- | --- | --- |
| Water Flow, GPM | 10,000 | 10,000 |
| Cooling Range, °F. | 113-78 | 113-78 |
| Wet Bulb Temp., °F. | 73 | 73 |
| Dry Bulb Temp., °F. | 75 | 75 |
| Process Conditions | | |
| Water Loading, gal/min-sq ft. | 27 | 1.4 |
| Air Loading, SCF/min-sq ft. | 550 | 150 |
| Air pressure Drop per foot of packing, inches of water | 0.6 | 0.1 |
| Volume of Contact Zone, cu.ft. | 5300 | 200,000 |
| Ground Area of Tower, sq.ft. | 1600 | 7000 |
| Height of Tower, ft. | 17 | 40 |
| Total Pump and Fan Horsepower | 700 | 800 |

| Design Conditions | Example III | Conventional Process |
| --- | --- | --- |
| Water Flow, GPM | 20,000 | 20,000 |
| Cooling Range, °F. | 115-85 | 115-85 |
| Wet Bulb Temp., °F. | 80 | 80 |
| Dry Bulb Temp., °F. | | |
| Process Conditions | | |
| Water Loading, gal/min-sq.ft. | 25 | 1.4 |
| Air Loading, SCF/min-sq.ft. | 550 | 100 |
| Air Pressure Drop per foot of packing, inches of water | 0.6 | 0.1 |
| Volume of Contact Zone, cu.ft. | 10000 | 400,000 |
| Ground Area of Tower, sq.ft. | 3500 | 11,500 |
| Height of Tower, ft. | 20 | 40 |
| Total Pump and Fan horsepower | 1350 | 1350 |

It can be seen from the foregoing examples that the ground area required for a cooling tower in which the process of this invention is performed is only 20 to 30 percent of the ground area required by towers of conventional design. Likewise, the height of the cooling tower using the process of this invention is reduced by a factor of one-half or more over that of the conventional tower. It can also be seen that although the air loading in the process of this invention is higher than in that of the conventional process, the total horsepower required by the water pump and the air fan together is less than that required in the conventional cooling processes of Examples I and II and the same as that required by the conventional process of Example III. Although the process of this invention has been described primarily as relating to processes for cooling water with air, the principles disclosed are equally applicable to the cooling of liquids generally with gases.

What is claimed is:

1. A process for cooling water by cross flow contact with air comprising the steps of: passing said water downwardly into a contacting zone enclosure in the shape of an inverted, frusto-conical annulus at a rate of from 3 to 30 gallons per minute, per square foot of contacting zone normal to the direction of flow of water, said enclosure being completely filled with a filamentous packing having little continuous extensive surface, and having about 80–95 percent free volume, said packing consisting of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the croos-sectional dimension of the filament portion in the direction of its axis times the number of such filament portions and not greater than the circumference of one of such approximately circular filament portions; drawing air through ports in the outer side of said contacting enclosure, through said packing and through ports in the inner wall of said enclosure by means of a fan mounted centrally within the circle defined by said annular enclosure, at a rate of from 200 to 800 standard cubic feet per minute, per square foot of packed zone normal to the direction of flow of gas so as to realize a pressure drop, in the air, per foot of packing parallel to the direction of flow of said air, of from 0.2 to 0.8 inches of water; expelling the air drawn through said contactIng zone from within the area central thereto; and removing cooled water from the lower end of said contacting enclosure.

2. The process of claim 1 wherein the pressure drop in the gas is from 0.3 to 0.6 inches of water, per foot of packing.

3. A process for cooling water by cross flow contact with air as recited in claim 1 wherein the flow of water through the packed contacting zone is from 8 to 25 gallons per minute per square foot of contacting zone normal to the direction of the flow of water, the flow of air is from 400 to 700 standard cubic feet per minute per square foot of packed zone normal to the direction of flow of air, and the pressure drop in the air is from 0.3 to 0.6 inches of water per foot of packing.

4. A process for cooling water by cross flow contact with air as recited in claim 1 wherein said filamentous packing is comprised of a material having a substantially non-wetting surface characteristic, the water in contact therewith tending thereby to form aggregates rather than to spread out in a film on the said surface.

5. A process for cooling water by cross flow contact with air as recited in claim 4 wherein said filamentous packing is comprised of a resinous material.

* * * * *